United States Patent [19]

Martin et al.

[11] 4,020,488
[45] Apr. 26, 1977

[54] ALARM AND/OR CONTROL APPARATUS

[76] Inventors: Robert Edgar Martin, 19 Elles Ave., Merrow, Guildford, Surrey; Edmond Francis Hasler, 'Pepilea', 75 Oakhill Road, Ashstead, Surrey, both of England

[22] Filed: May 7, 1973

[21] Appl. No.: 358,166

[30] Foreign Application Priority Data

May 10, 1972 United Kingdom ............ 21929/72

[52] U.S. Cl. ........................... 340/412; 340/213 Q; 340/419; 340/420; 340/242; 340/244 C; 328/1; 137/392; 137/558

[51] Int. Cl.² .................. G08B 19/00; H04Q 3/00; E03B 7/07; F16K 37/00

[58] Field of Search ............... 340/412, 244 C, 225, 340/213 Q, 413, 181, 207, 52 H, 227, 248 A, 188 R; 307/219, 204, 211; 328/231, 1, 2, 3, 4, 5, 6

[56] References Cited

UNITED STATES PATENTS

| | | | |
|---|---|---|---|
| 2,748,379 | 5/1956 | Brown | 340/244 C |
| 3,217,306 | 11/1965 | Hillman | 340/413 |
| 3,279,379 | 10/1966 | Klyce | 340/244 C |
| 3,289,193 | 11/1966 | Worthington | 340/248 A |
| 3,431,557 | 4/1969 | Thomas | 340/248 A |
| 3,474,434 | 10/1969 | Lindberg | 340/188 R |
| 3,541,539 | 11/1970 | Trumble | 340/227 R |
| 3,581,014 | 5/1971 | Vogel et al. | 340/181 |
| 3,683,354 | 8/1972 | Enk | 340/412 |
| 3,714,646 | 1/1973 | Nurnberg | 340/412 |
| 3,755,804 | 8/1973 | Johnson | 340/244 C |
| 3,806,921 | 4/1974 | Pappas | 340/412 |
| 3,818,431 | 6/1974 | Hosaka | 340/52 H |

FOREIGN PATENTS OR APPLICATIONS

1,020,481 2/1966 United Kingdom ............ 340/412

*Primary Examiner*—Thomas B. Habecker
*Attorney, Agent, or Firm*—Hill, Gross, Simpson, Van Santen, Steadman, Chiara & Simpson

[57] ABSTRACT

Apparatus as described for indicating, for alarm and/or safeguard control purposes, when the value of a second parameter lies beyond (i.e. is above or below) a predetermined limit. The apparatus includes two or more sensors each arranged to provide a respective warning signal when the parameter lies beyond a respective specified value, the value for at least one of the sensors being equal to or beyond the predetermined limit; and logic means including a validation circuit connected to the two sensors and arranged to provide a "parameter-beyond-limit" signal, which may be used, for example, to operate an alarm and/or an emergency trip, only when both sensors provide a warning signal. Various forms of apparatus are described in which the parameter sensed is the level of water in various items of steam plant as used in power stations, e.g. boilers, vacuum condensers, bled steam lines and direct contact feed heaters, to provide an indication of high and/or low water level. The apparatus may also be used for monitoring the value of other sorts of parameter in various sorts of processes and equipment, for example the temperature of a furnace.

7 Claims, 9 Drawing Figures

ALARM AND/OR CONTROL APPARATUS

FIELD AND BACKGROUND OF THE INVENTION

This invention relates to apparatus for indicating, e.g. for an alarm and/or safeguard control purpose, when the value of a sensed parameter of a process or in a system is beyond a predetermined limit.

In many forms of apparatus or process, it is required to hold a parameter above or below a predetermined limit or within certain normal limits. For example in a process where temperature is controlled, the control system may operate to hold the temperature between two levels. If the temperature should rise above the upper level and/or fall below the lower level of the range of levels permissible under the normal control conditions, then it may be required to operate an alarm or to effect a safeguard control operation. Similarly, in a boiler where the water level is controlled between normal limits, if it should fall below the lower level and/or rise above the upper level of these normal limits, then an alarm operation and/or a safeguard contol operation may be required. The safeguard control operation or the action which has to be taken on such an alarm may well be a matter of great expense or serious inconvenience. For instance, with a large steam-raising boiler feeding a turbine of an electrical generating plant, it may be necessary to remove all the load from the generator and from the boiler in the event of there being insufficient water in the boiler. With a steam driven turbo-generator, similar requirements may exist if the water level in a condenser should rise because of a failure of an extraction pump. In a process plant in which material is temperature-controlled, an emergency shut down may be very costly in damage to the plant, for example through molten material solidifying. For these reasons, a very high degree of reliability is desirable for alarm or safeguard control apparatus in large plant or process systems such as have been described above. Whilst it is essential that the parameter condition is detected and the alarm or control operation effected, it is important that the alarm or the safeguard control should not normally be effected through any malfunction or failure in the alarm and/or control apparatus.

It is an object of the present invention to provide an improved form of apparatus for alarm or safeguard control operative when the level of a parameter is outside a predetermined limit which will have a high degree of reliability yet wherein safeguards are provided against false alarm or control operation being effected due to faults in the apparatus.

SUMMARY OF THE INVENTION

Accordingly, the apparatus of the present invention is characterised in that it comprises two sensors each arranged to provide a respective warning signal when the parameter lies beyond a respective specified value, said value for at least one of the sensors being equal to or beyond said predetermined limit, and logic means including a validation circuit connected to the sensors and arranged to provide a parameter-beyond-limit signal only when both of the sensors connected thereto provide a warning signal.

Thus, for example, in an arrangement in which the apparatus is arranged to indicate if the level of water in an item of steam plant, e.g. a bled steam line, exceeds a predetermined limit, the provision of said parameter-beyond-limit signal, which in this case will be a "water level high" signal, can be taken to indicate a high water level to a good degree of reliability as it is validated by two independent sensors. Continuing with the same example, the "water level high" signal may be used to operate an alarm and/or an emergency trip mechanism. If the two electrodes are located at the same level in the steam line, the logic means may also be arranged to signal a "water" alarm if either one indicates water, assuming that the consequences of an undetected high water level are so important as to render false alarms tolerable. Normally, however, a "trip" signal will only be provided if the "water level high" signal is validated by two sensors.

To provide an increased degree of security, three or more sensors may be provided so that a plurality of independent validation circuits can be used, whereby a more reliable cross-validation may be obtained of the sensed parameter being beyond the desired limit. As the number of sensors and validation circuits is increased, the chance of a desired parameter-beyond-limit signal not being provided, due to equipment failure, is reduced. For example, in an arrangement described in more detail hereinafter, eight sensors are employed and a first plurality of validation circuits are connected to respective pairs of the sensors to each provide an alarm signal signal if the sensors connected thereto both provide warning signals. Security against a false alarm is therefore provided. A second plurality of validation circuits are each connected to a respective three of the sensors to each provide an emergency trip signal if the three electrodes connected thereto all provide warning signals. Thus, a higher security against false tripping is provided, yet the chances of a necessary trip not occurring are minimal.

The sensors may each be arranged to respond to a respective different specified parameter value, or may be arranged in corresponding pairs each arranged to respond to a respective different specified parameter value. If required, at least one of the sensors may be arranged to respond to a parameter value which is not beyond the predetermined limit.

The apparatus may also be arranged to indicate if the sensed parameter lies outside of a range of values defined by two predetermined limits, e.g. to indicate if a water level is above a maximum permitted value or below a minimum permitted value.

Preferably each of the sensors, or two or more sets of sensors, are energised from independent power supply sources. The sensors would normally be transducers providing electrical signal outputs and energised from an electrical power supply source. The choice of combination of outputs required to give an alarm or control signal would, of course, be made taking into account the possibility of a supply source failure where different supply sources are utilised for different sets of sensors.

The sensors may form part of a level indicating system, e.g. by having sensors at a number of different levels with a corresponding sensor controlled indicator lamp for each level. The sensors may be interconnected as described in U.K. Pat. Specification No. 1,056,032 to provide indication of component failure. Further fault indication may be effected by comparing the outputs of two level sensing systems in the manner described in U.K. Pat. Specification No. 1,257,737.

Both alarm and safeguard control signals may be obtained in the manner described above. In addition to the component fault indication provided by the two patent specifications mentioned above, operational validation even in the presence of such faults may be obtained for both alarm and safeguard control signals in the manner described above. However, as in the arrangement briefly described above, it may be preferred to provide validation from a larger number of sensors in the case of a safeguard control signal than are considered necessary for an alarm signal.

The safeguard control operation would normally be an automatic control operation. Manual remedial action might be taken by an operator on receipt of an alarm signal and the choice of operation may be influenced by a knowledge of factors outside the scope of the instrumentation. The automatic safeguard control would be an emergency operation independent of operator intervention.

BRIEF DESCRIPTION OF THE DRAWINGS

The invention may be more readily understood from the following description of a number of embodiments thereof, given by way of example only, reference being made to the accompanying drawings, in which.

DESCRIPTION OF THE PREFERRED EMBODIMENTS

Figure 1:
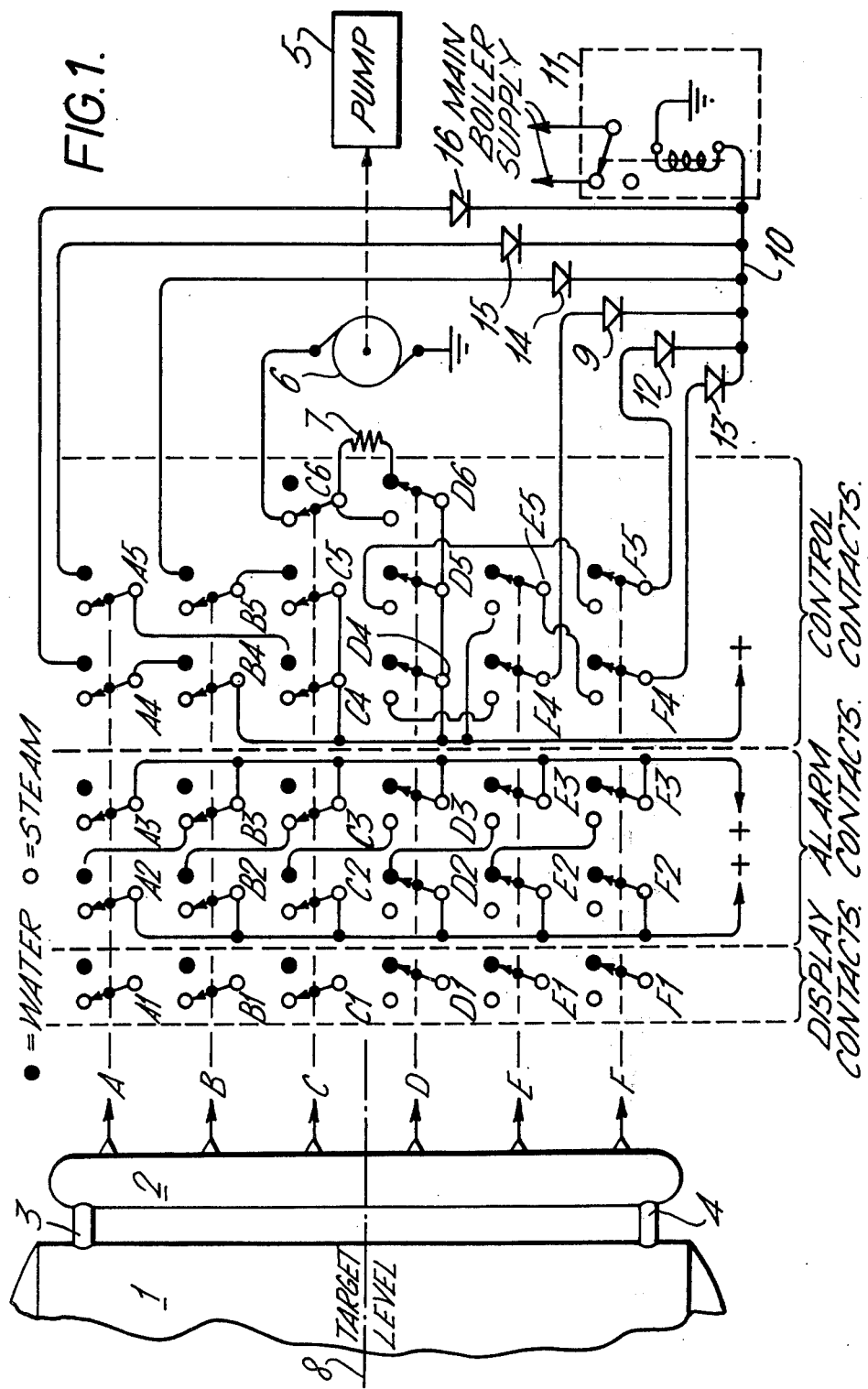
FIG. 1 is a diagram illustrating part of a water level indicating, alarm and control system for indicating and controlling the water level in a simple boiler and including circuitry for validating the detection of high and low water levels.

FIG. 1 illustrates diagrammatically part of a simple low pressure steam raising boiler 1 of the kind known as a package boiler and operating at a pressure less than 1000 1bf/in² and which is intended to run with a minimum of supervision. The boiler 1 is fitted with a level indicating device of the type known as and hereinafter referred to as "Hydrastep" and having a minimum of six water level sensors each with a corresponding measuring channel. For a detailed description of the "Hydrastep" system, reference can be made to "Lieproof Measurements: the Multiple Binary Philosophy of the Hydrastep Boiler Water Level Gauge" by E.F. Hasler and R.E. Martin in Measurement and Control, 6, No. 4, April 1973. The sensors comprise electrodes arranged at appropriately spaced different levels in a vessel 2 connected at its top and bottom to the boiler drum by pipes 3 and 4. The various channels are indicated diagrammatically as having electrical output leads A, B, C, D, E and F. The signal condition on each of these leads indicates the presence of either steam or water at the appropriate level. Associated with the six channels are output devices shown as changeover contact sets (A1–A5 to F1–F5, C6 and D6) which are arranged so that all the sets associated with any one level are actuated together by one electro-magnetic relay operating coil when the electrode concerned changes its environment from water to steam or vice versa. Those fixed contacts to which the moving contacts of each set make connection when the associated electrode is in water are shown filled black, e.g. with the electrode connected to lead F in water the moving contacts of the contact sets F1 to F5 make contact with the right-hand fixed contact of each set. Correspondingly, the fixed contacts with which contact is made when the associated electrode is in steam are shown unfilled.

Of the contact sets, A1 to F1 are used to operate a colour-change display lamp assembly for each level, one colour indicating water and another indicating steam. A suitable colour-change lamp assembly is described in U.K. Pat. Specification No. 1,202,695. The second and third contact sets for each level, A2, A3 to F2, F3 are cross-connected as shown to give an "equipment fault" alarm as described in U.K. Pat. Specification No. 1,056,032, an alarm being provided if the contact sets indicate, obviously incorrectly, that water lies above steam.

It is assumed that only a single source of electrical power exists for the boiler unit, and that if this source fails the fuel and water feeds are automatically shut off by the auxiliary gear provided and the boiler rendered safe. Only the one power supply is required, therefore, to operate the "Hydrastep" level gauge in this example. For simplicity of explanation, it is further assumed that the thermal input to the boiler is required either to be constant or to be controlled by some external means as a function of the load on the boiler, so that the only variable it is necessary to control in this instance is the water level in the drum.

The boiler has a water feed pump 5 driven by an electric motor 6 and a resistor 7 is connectable in series with the motor to reduce the pumping rate. The initial setting of the feed water pump motor 6 is arranged by adjustment of the resistor 7 to be approximately such, under average load conditions, that the drum water level will lie about midway between electrodes C and D i.e. at the target level shown at 8 in FIG. 1. In this condition, by means of contacts C6, D6, the resistor 7 is in series with the motor 6. If the load on the boiler is now higher than anticipated, the water level will fall until such time as the electrode associated with lead D changes from water to steam causing contact D6 to change over, by-passing resistor 7 and applying full power to the feed pump motor 6. The water level now starts to rise until D reverts to water, switching the pump motor 6 back to half power. If the higher load persists, D will continue to switch between water and steam conditions, maintaining the water level very close to level D. If the load now falls to below average, the level will rise until C changes from steam to water, so that C6 will switch the pump motor 6 from half power to off. Again, while the lower load persists, the drum level will remain very close to C.

Should the load now increase beyond the capacity of the boiler, or should the feed pump fail, the level will continue to fall after passing D until the electrode associated with lead E changes from water to steam. At that instant, the + side of the supply voltage (which has already been connected to the left-hand fixed contact of E4 by D4 in the steam position) is connected to the moving contact of E4 and thence via an isolating diode 9 to an emergency trip line 10, which may conveniently be made to energise a main circuit breaker 11 and shut down the boiler.

Although improbable, it could happen that a fault on the "Hydrastep" gauge has caused the relay associated with lead E to stick in the "water" position. In this event, contact D5 has already energised the left-hand fixed contact of F5, and as the level continues to fall lead F will eventually see "steam." At that instant F5 will energise the circuit breaker 11 via diode 12 and the emergency trip line 10, again shutting down the boiler. Similarly, for the relay associated with lead D stuck in the "water" position, a trip will be made via the contact sets E5 and F4, an isolating diode 13, the trip line 10 and the circuit breaker 11.

Alternatively, should a fault in the feed pump motor 6 controller occur such that water was pumped into the boiler 20 at a higher rate than steam was extracted by the load, the level would continue to rise after reaching level C. When water appears at level B, the boiler is shut down through the contacts C5 and B5, a diode 14, the emergency trip line 10 and the main breaker 11. If, at the same time, the relay associated with lead B were stuck at steam, that trip would not occur and the level would rise further to A. When A5 changes over, the trip circuit is made via C4, A5 and diode 15. Again, if the relay associated with lead C is stuck at steam (which would be one possible cause of the feed pump continuing to run), a trip will occur through B4, A4 and the diode 16.

Those skilled in the art will appreciate that the isolating diodes 9 and 12 to 16 in the apparatus shown in FIG. 1 and also isolating diodes used in certain other forms of apparatus described hereinafter are provided to avoid any unwanted circuit interconnections. It will also be appreciated that with certain types and arrangements of logic isolation is inherent, in which case isolating diodes need not be used.

In practice, of course, it is likely that contacts C6 and D6 would control the feed pump speeds through slave relays within the motor control unit, but the controlling action by C and D relays would still be effectively as described. If required, a fuel flow controller could be linked to the feed water flow for certain applications. Closer control could be achieved by adding one or more electrodes at intermediate levels between C and D, dependent on the number of steps available on the motor speed control.

Such a system has been shown to be fail-safe in respect of plant or instrumentation failure, and also fail-operative in respect of partial failure of the gauge. The system is fail-safe in that the main boiler supply is tripped if the water level is too high or too low. However, to ensure against false tripping caused by equipment failure, the supply is only tripped if the high or low level indication of any one sensor is validated by another. Thus, the boiler supply if only tripped if any two of the electrodes connected to leads A, B and C indicate water or if any two of the electrodes connected to leads D, E and F indicate steam.

It is common practice where extreme reliability is required to duplicate or triplicate important instrumentation, often to the extent of employing a "two out of three" philosophy. By the use of similar logic systems using two instruments, it is claimed that reliabilities at least equal to a "two out of three" system may be achieved.

By way of a second example of failure validation in accordance with the invention, a vacuum condenser may be considered, of the type used to collect the waste steam output from a power station turbine. Such a condenser operates under vacuum conditions to condense up to 26 tons of steam per minute in the case of a modern 500 MW generator, to be recycled through the boiler. If the water is not extracted from the condenser sufficiently quickly, there is about one minute available for remedial action to be taken after the water passes the high level mark.

On the other hand, should the unit be tripped out because of a false alarm, the load which has been shed by its generator must be made up by the use of less efficient plant with a consequent financial penalty. The high level alarm and/or emergency tripping arrangements for such an example must be as secure as possible against both measuring equipment and plant malfunction.

Figure 2:
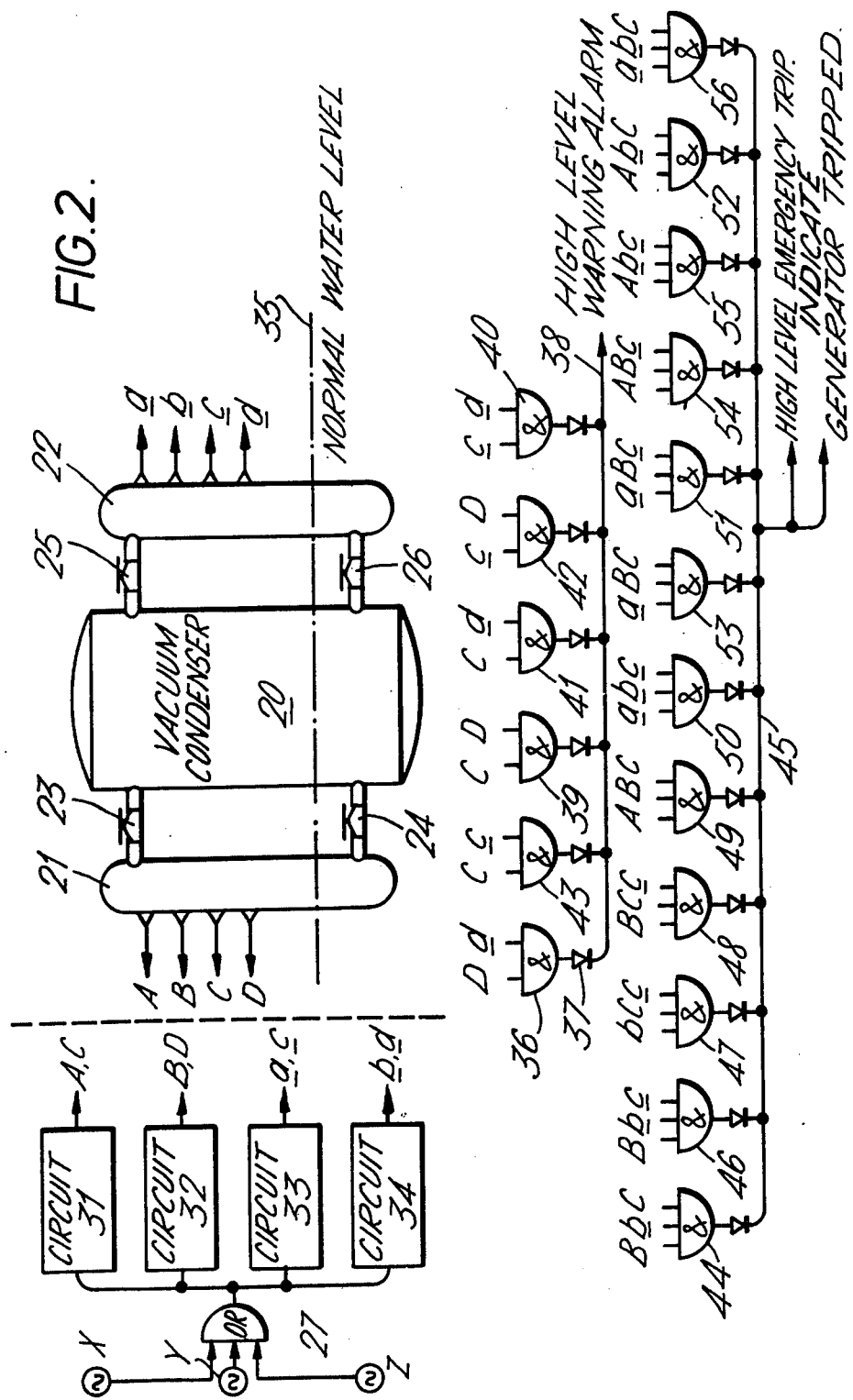
FIG. 2 is a diagram illustrating a vacuum condenser with part of a validated high water level emergency trip and alarm system for use with the condenser.
Figure 4:
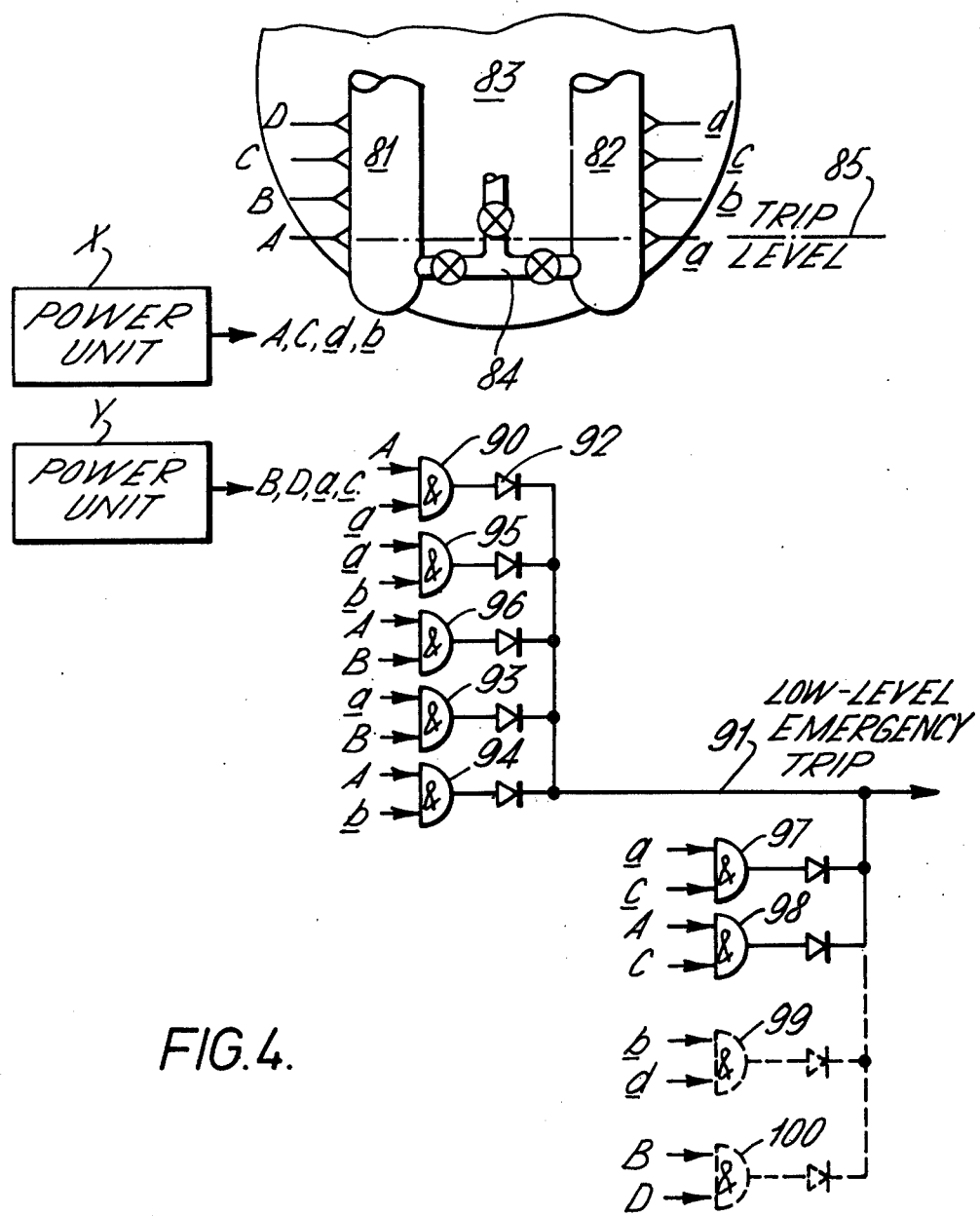
FIGS. 4 and 5 are diagrams illustrating an automatic validated low-level trip responsive to water level in a heavy-duty boiler.

FIG. 2 illustrates one of a considerable number of possible arrangements of such a condenser with a control and alarm system within the scope of this invention, again using a multiple binary system of measurement such as "Hydrastep." In FIG. 2, the system shown is a twin "Hydrastep." The condenser has a body 20 in communication with a first pressure vessel 21 having electrodes A, B, C and D arranged therein in descending order at specific levels, all above the normal water level, and with a second pressure vessel 22 carrying electrodes a, b, c and d arranged to correspond in level to those of vessel 21. Isolating valves 23, 24, 25 and 26 are provided in the pipework connecting the body 20 and each of the vessels 21 and 22 respectively so that both the water and steam connections may be closed to facilitate the maintenance of either vessel while the unit is still operating. Alarm logic similar to that shown in FIG. 1 and as described in U.K. Pat. Specification No. 1,056,032 may be provided for each of vessels 21, 22. In addition, it is assumed that level comparison logic such as is shown in FIG. 4 of U.K. Pat. Specification No. 1,257,737 for coincident levels is also incorporated. The effects of pipework blockage or a vessel leak, however, are the inverse of that explained for a boiler in U.K. Pat. Specification No. 1,257,737, i.e. the faulty vessel will indicate lower than it should instead of higher, since the condenser is under vacuum instead of pressure. For simplicity, and as they do not form part of the present invention, neither of these two fault alarm circuits, nor the display circuits, are shown in FIG. 2.

In an electrical power station, it may be assumed that two or more electrical power sources will be available for essential instruments. In this case first and second a.c. supply sources X and Y are provided, separately fused, together with an emergency supply Z in the form of an inverter driven by the station tripping battery. The X, Y or Z supply is selected in order of preference by an OR gate 27, which is a conventional arrangement usually of heavy-duty relays such as is generally available in power stations. This "non-failing" supply is used to separately drive all four parts 31, 32, 33 and 34 into which the "Hydrastep" circuits are separated, such that circuit 31 concerns only electrodes A and C, and so on as is shown in FIG. 2. The failure of any one such circuit part is arranged, by its connection to alternate levels, to actuate an equipment fault alarm system such as is described in U.K. Pat. Specification No. 1,056,032, but to leave the rest of the "Hydrastep" equipment operating normally.

As will now be explained, a number of validation circuits, each consisting of a two-input AND gate and an isolating diode, are arranged to provide validated high water level warning alarms.

If, due to some malfunction of the auxiliary plant (e.g. failure of the water extraction pump) the water level rises from the normal level 35 to that of the lowest electrodes, both D and $d$ should change to indicate "water." In logic terms, when an electrode changes from steam to water its output may be said to change from a logical 0 to a logical 1 (this corresponds to the change from a steam to a water relay contact as described in the first example). Subject to any minor level differences between the vessels 21 and 22, the 1s from D and $d$ will be applied substantially simultaneously to the two inputs of an AND gate 36, validating each other and enabling the gate to produce a validated output signal through an isolating diode 37 on a high level warning alarm 38. (If electromagnetic relay circuits are used, the operation of the AND gate 36 corresponds to the operation, for instance, of the contact sets B4 and A4 in the first example, i.e. both inputs must be at logical 1 (water) for the gate to operate).

If, however, vessel 22 were shut off and empty for maintenance purposes, $d$ would not produce a 1. The effect of a leak in vessel 22 could be similar, insofar as the water level in that vessel would be depressed. Again, an instrument fault could exit on $d$ such that it was stuck in the 0 condition. In either eventuality, the 1 from D must still be validated by some means before an alarm can be given. If the level continues to rise, C will also produce a 1, and an AND gate 39 will therefore operate. Similarly, with vessel 21 out of service a 1 on $d$ could be validated by a 1 on $c$ through an AND gate 40. The coincidence of 1s from C and $d$ (AND gate 41) or from $c$ and D (AND gate 42) renders the system "fail-operative" for either D or $d$ respectively stuck at 0. For both D and $d$ faulty, an AND gate 43 will accept 1s on both C and $c$. Although this system could be extended further to allow for even more concurrent faults by including levels B and $b$, it is likely that the time available would have been shortened too much by the time level B was reached for effective manual action to be taken (although automatic action using the same logic may perhaps be useful), such as the start-up of a reserve extraction pump, if available, or adequate reduction of generator load and boiler output. Subsequent automatic remedial action must therefore be initiated at level B, and in this example it is assumed to consist of a complete shut-down of the generator and its associated boiler unit before damage is caused to the turbine.

As is explained immediately below, the system shown in FIG. 2 also includes a plurality of further validation circuits, each consisting of a three-input AND gate and an isolating diode, arranged to provide validated high water level emergency trip signals.

In normal circumstances, levels B and $b$ would give logical 1s substantially simultaneously, but to avoid the possibility of a false trip (which is considerably more serious than a false alarm) both those 1s must also be validated by a 1 from level cm C, which for security is also on a separate electronic circuit (circuit 31) from either B (circuit 32) or $b$ (circuit 34). If these three 1s are present, an AND gate 44 supplies a validated output signal on to a line 45 to trip the generator and to indicate to the operator the emergency action taken. Similarly, for a fault on C, an AND gate 46 will accept 1s from B, $b$ and $c$. Similar self-validating combinations ($b$, C, $c$ and B, C, $c$) are presented to AND gates 47 and 48. To allow for conditions when any two of the separate "Hydrastep" circuits are out of service at the same time, levels A and $a$ are used for validation. If, for instance, vessel 22 were shut down and empty for maintenance, A, B and C of vessel 21 would be accepted by AND gate 49, or if vessel 21 were shut down $a$, $b$ and $c$ would be accepted by gate 50. Other alternatives when two of the four circuits were out would be $a$, B, $c$ (gate 51) and A, $b$, C (gate 52). Again, in the unlikely event that three individual electrode channels were simultaneously stuck at steam, a trip could still be effected via $a$, B, C (gate 53), A, B, $c$ (gate 54), A, $b$, $c$ (gate 55), or $a$, $b$, C (gate 56). It is, of course, equally unlikely that three of the six upper channels would be stuck at water simultaneously, although if this did occur a false operation would result. In this particular example, it is considered less serious for a false trip to occur than for a required trip to fail, and the logic has been devised to have the same bias. If the opposite were the case, then this could be covered in the logic by increasing the input combinations for each gate to four, i.e. providing three validations for any one input instead of the two validations per input given in the automatic trip portion of this example.

Instrument relays having six sets of contacts, as shown in FIG. 1, are available commercially and are incorporated in the "Hydrastep" liquid level indicating apparatus as standard equipment. The larger number of comparisons shown in FIG. 2 could be reduced by using the results of other comparisons; for example, the C and $c$ comparison of gate 43 could be used on gates 47 and 48 to reduce the interconnections required. Solid-state logic forms such as semi-conductor integrated circuits may offer advantages over relay circuits in many applications of this nature. This includes the facility of carrying out the large number of redundant comparisons shown in FIG. 2 to give security against failure of any one gate more simply in practice than by using relays.

By way of a third example of validation in accordance with the invention, an arrangement for the protection of the main intermediate - pressure turbine on a large turbo-generator from the damaging effects of water in bled steam will now be described. It is common practice to use a proportion of the steam which has already passed through the high-pressure turbine and been reheated for the purpose of operating other auxiliary apparatus such as turbine feed-water pumps and the pre-heating of feed water by means of heat exchangers. Apart from the possible appearance of condensate in bled steam lines particularly during start-up, it can happen that a leak occurs on a heat exchanger. It is useful for the intermediate pressure applicable to the bled steam lines to be in the region of 1000 lbf/in², whereas the pressure on the feed water side of the heat exchanger must be in excess of the boiler operating pressure, i.e. up to 2800 lbf/in². For a leak of significant proportions water can be driven back down the bled steam line to cause damage to the intermediate pressure stage of the turbine.

Figure 3:
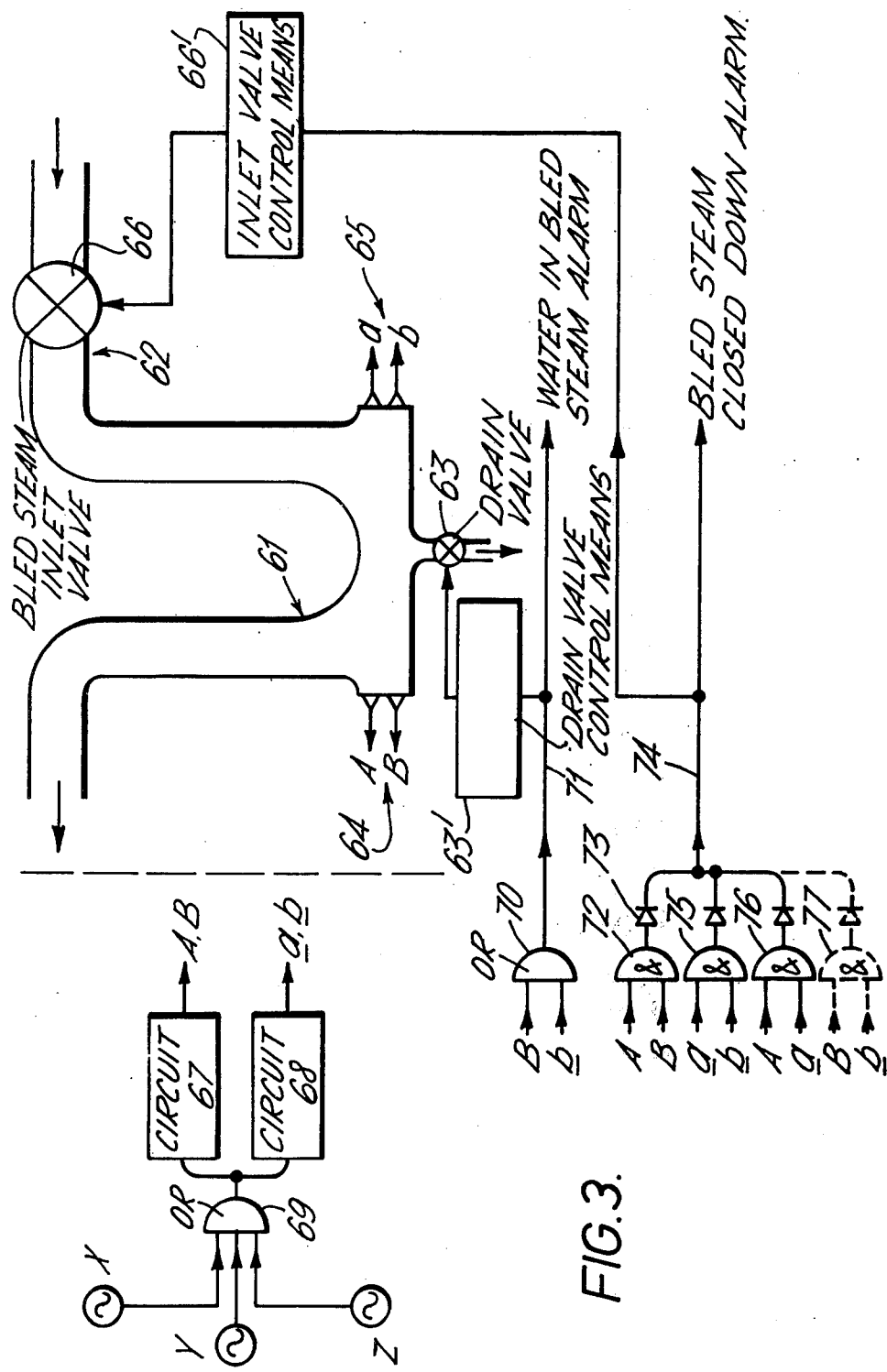
FIG. 3 is a diagram illustrating an arrangement for the protection of an intermediate pressure turbine from the effects of water in bled steam and including circuitry for validating the detection of water in the bled stream.

FIG. 3 shows a modification to an existing U-shaped expansion bend 61 in a bled steam line 62 with its conventional steam drain valve 63 and control means 63' therefor, wherein water-level sensing electrodes A and B are fitted one above the other at 64 on one side of the bottom of the U-bend and electrodes $a$ and $b$ are similarly fitted at 65 on the other side of the bottom of the U-bend. A bled steam inlet valve 66 controls entry of bled steam into the expansion bend, the valve being operated by control means 66'. Sensor circuits 67 and 68 are supplied via an OR gate 69 from alternative power sources X, Y and Z, as in the arrangement of FIG. 2.

If it is assumed that a small amount of condensation occurs during start-up this will accumulate at the bottom of the U-bend, eventually causing either electrode B or $b$ to indicate water. The resulting logical 1 from either B or $b$ actuates an OR gate 70 to provide an output on a line 71 to give a first "water in bled steam" alarm to the operator and to cause automatic opening of the steam drain valve 63 via its control means 63' to eliminate the condensate. When the level falls such that both B and $b$ again indicate steam, the alarm is cancelled and the drain valve is automatically closed.

The same sequence of operations will apply for a minor leak in a heat exchanger, with the open/closed cycle repeating as water from the leak accumulates. The recurrent operation of the first alarm after start-up is complete is indicative of such a leak, but while the effect of this leak can be controlled by the automatic operation of the drain valve it may be undesirable to take further action.

Should the leak become more severe, to the extent that the water level continues to rise with the drain valve 63 fully open, electrode A or $a$ will also indicate water when a dangerous level is reached. It it is assumed that at the same time circuit 68 is out of service for maintenance, 1s from A and B together will operate an AND gate 72 which will provide an output signal via an isolating diode 73 to a line 74, giving a shut-down warning alarm to the operator and automatically closing the bled steam inlet valve 66 via its control means 66' to prevent water reaching the intermediate - pressure stage of the turbine. In these circumstances it is not desirable that the inlet valve 66 should be reopened automatically if the levels falls: this should only be performed manually after the cause of the high water level has been investigated and repaired. A similar operation is obtained from electrodes $a$ and $b$, if circuit 67 is out of action, via an AND gate 75. If both electrodes B and $b$ are faulty (i.e. stuck at steam), the first warning will not be given and the drain valve 63 will remain closed, but the major risk is still protected by A and $a$ appearing together at an AND gate 76 to close the inlet valve 66.

An alternative arrangement may be to operate on B and $b$ alone, reserving A and $a$ as additional safeguard covering possible failure of B and $b$. In this case, the OR gate 70 would operate as before, on the basis that it is reasonable to expect that B will indicate water in advance of $b$ (due to inequalities of position or variations from side to side of the water level), or vice versa. It is then probable that if the level rises both B and $b$ will show water before either A or $a$, and an AND gate 77 (shown dotted) may be included in the logic sequence. In this case, A or $a$ will only be used if a gross variation occurs between the levels on each side of the U-tube, or under fault or maintenance conditions on the sensing equipment.

In all the foregoing logic of the FIG. 3 apparatus, a water indication from any one electrode must be validated by one other electrode before drastic action can be initiated, but the arrangement is such that the maximum of protection is still provided for the turbine.

Additional options are also available (not shown) with A validated by $b$ or $a$ validated by B to cater still further for faults in the "Hydrastep" equipment which could inhibit the previous selections.

Figure 5:
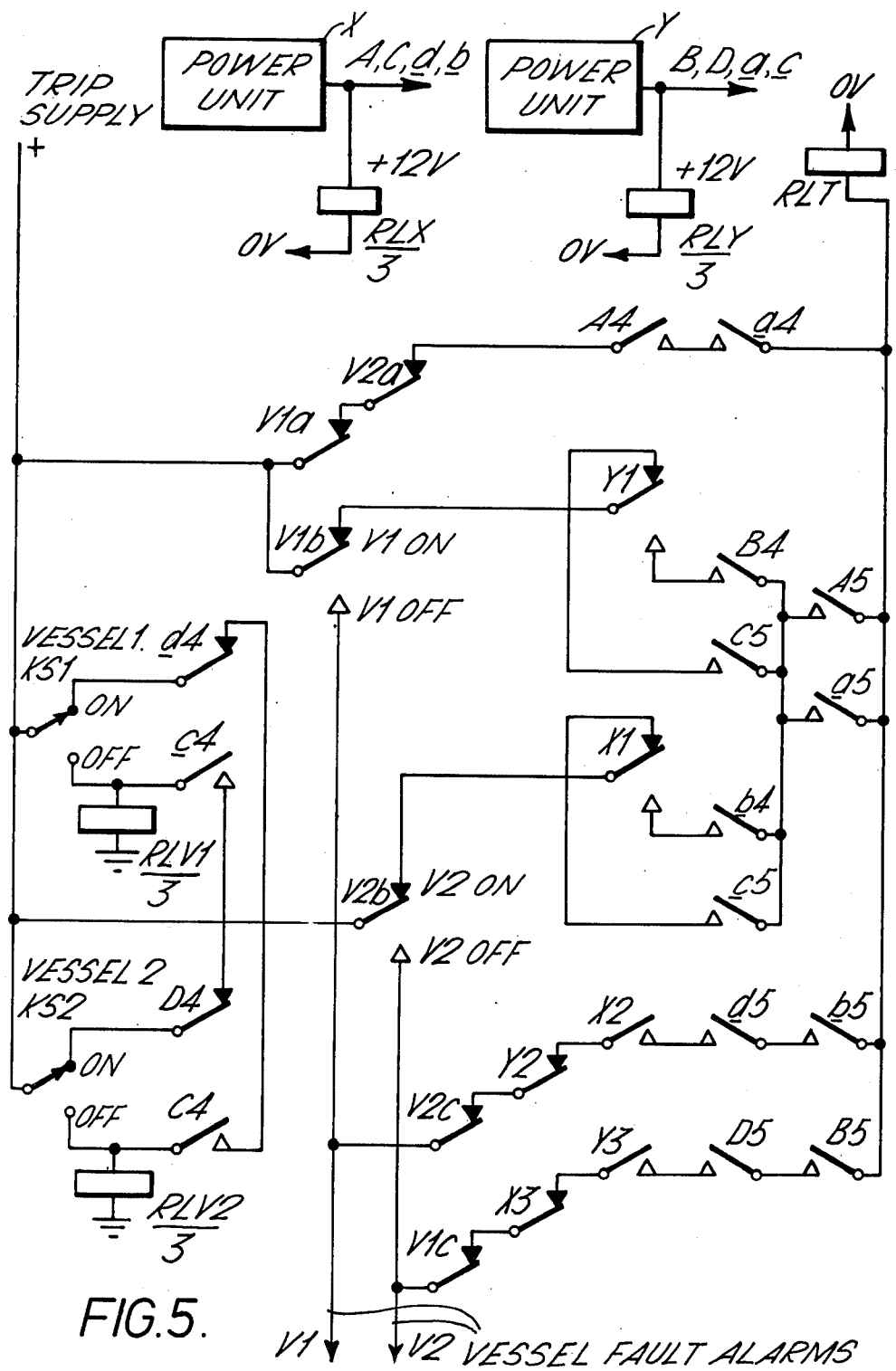

FIGS. 4 and 5 illustrate a further embodiment of the invention in the form of an automatic low level trip arrangement responsive to the water level in a boiler, typically a boiler for large power stations.

In U.K. Pat. Specification No. 1,257,737 there is described how validation of water level sensing output signals may be obtained by providing a twin two gauge level sensing system, that is two sets of sensors at each end of the boiler, and by comparing the electrical output signals. FIGS. 4 and 5 of the accompanying drawing illustrate a means of providing a low level tripping facility whether or not the full facilities of a twin two gauge level sensing system are provided. The system described offers the same high degree of security against electronic faults as is obtainable with the full system and utilises the same validation logic and tripping circuits.

For a low water level trip for a boiler on a large steam generating power station there are two operating constraints: it is necessary that a wanted trip must not occur before the water level drops to the predetermined value, in order to allow for the close timing of the emergency feed pump start up, and a wanted trip must not be delayed to allow the water level to fall appreciably below the predetermined value, since typically only 14 seconds might then be available for the trip instruction to become effective. In a large boiler, the level differential between the two ends of the drum might be as much as 10 inches (250 mm) and it is not acceptable to employ validation between the two vessels of a level sensing system at opposite ends of the boiler to determine that a trip is required. However the two above-mentioned constraints should theoretically be applied to the water level in any point in the drum, which in practice may be interpreted as applicable to the level of either end, in order that the internal pipe work is not damaged by exposure to steam conditions.

In the arrangement illustrated in FIG. 4 there are shown two vessels 81 and 82 arranged at one end of the drum of a heavy-duty boiler 83 and connected to the drum by valved pipework 84 so that the water level in the vessels corresponds to that in the drum, each vessel being separated from the tee point by identical stop valves and pipework on both steam and water sides. The vessel 81 contains a full set of sensing electrodes A B C D etc., whilst the vessel 82 is for providing security only for the purpose of the low level trip and has active electrodes only at the four lowest locations $a$, $b$, $c$, $d$. Two similar vessels would typically be provided at the other end of the drum as described in the aforementioned U.K. Pat. Specification No. 1,257,737. The logic arrangement of FIGS. 4 and 5 of the present application is applicable to the two vessels at one end of the drum. It is assumed that the electrodes $a$, $b$, $c$, $d$, fitted in vessel 82 correspond in level to the four lowest electrodes A B C D in vessel 81 and the trip level 85 is that at which the channels A and $a$ change from water to steam. Each channel has an associated multi-contact relay which takes up one or other of two states according to the condition sensed by the sensor.

For control operations to be secure, the possibility of a fault occurring in the sensing system in such a sense as to initiate an unwanted action, or to inhibit a wanted one, must be offset by providing a logical validation for the measurement. To cover the variety of instrument faults which are possible, singly or in combination, a corresponding variety of logical validations are required.

The probability of an error, and particularly of an undetected error, of a magnitude exceeding + 1 step in level, is already extremely small provided that indicated faults are repaired promptly and not allowed to accumulate. The two constraints defined above, however, call for absolute accuracy from the level sensors since there is no permissible tolerance for the level at which a trip is required. By means of the validation logic shown in FIG. 4 this absolute accuracy can be provided in the presence of any fault in the sensing system occurring singly and also for certain combinations of faults occurring coincidently, on the understanding that precautions are taken in the high pressure components and construction to ensure that the levels are the same in the two sensing vessels.

The channels on vessel 82 are allocated between two power units X and Y already serving vessel 81 such that when A is fed from X, $a$ is fed from Y, B from Y, $b$ from X and so on. A total of eight channels will thus be fed from each power unit. Provided both X and Y do not fail simultaneously, power will always be available to either A or $a$ at the required tripping level.

The logic for the normal trip condition, i.e., with all of the level sensors in service and free of any fault, will then be A showing steam validated by $a$ also showing steam and operating an AND gate 90, the output from the gate 90 being passed to a low water level emergency trip line 91 via an isolating diode 92. However, A and $a$, being at the lowest level, are not subject to the additional validation logic applicable at other levels for the "water above steam" philosophy to operate an equipment fault alarm; either could fail in such a way that water was permanently indicated even when steam was present, without a fault alarm being raised. Provision must therefore be made in the logic so that such a fault will not inhibit a wanted trip.

For a single malfunction, involving an electronic failure of either A or $a$, or of the power unit (X and Y respectively) associated with either, AND gate (93 or 94) gives validation of $a$ or A by B or $b$ respectively. Similarly, if one vessel is shut off, $a$ or A may be validated by $b$ or B respectively via AND gate (95) or (96). For vessel 81 and power unit X shut down, $a$ may be validated by $c$ through an AND gate (97), or for vessel 82 and power unit Y both off A and C together can operate an AND gate 98. In all of the above cases, the trip circuit is finally completed only when the water level drops below level A or $a$, which are nominally coincident.

The requirements of the constraints specified above can thus be met when the equipment is in full working order, when any one malfunction occurs, and in some instances when two malfunctions occur simultaneously.

For two simultaneous malfunctions which between them involve both channels A and $a$, a choice must be made whether to accept whatever consequences may occur if the generator is not tripped at all, or to allow the wanted trip to occur earlier at the B/$b$ level in these circumstances, as shown by dotted additional AND gates 99 and 100. Gates 99 and 100 provide for vessel 81 and power unit Y off and vessel 82 and power unit X off, respectively. They can be embodied as automatic relays designed to operate when the corresponding power unit fails, the relays being in series with key switches operating the vessel isolating valves. It is, of course, highly improbable, given responsible maintenance, that two malfunctions and a plant malfunction requiring a trip will, all three, occur at the same time.

The logic outlined in FIG. 4, and including gating factors related to the possible malfunctions discussed above, may be realized by the circuits of FIG. 5, which uses the multicontact sets available on each of the level sensing channel relays. Of the six contact sets provided, set No. 1 is used for the display and sets 2 and 3 for the fault alarm, as in the arrangement of FIG. 1, and sets 4, 5 and 6 are available for logic operations. In FIG. 5, sets 4 and 5 only from each channel concerned are required for the logic, together with four additional relays RLV1, RLV2, RLX and RLY, each equipped with 3 changeover contact sets, and two single-pole changeover key switches, KS1 and KS2.

The keys to the locks for the stop valves for each of the vessels 81 and 82 will normally be stored in key switch KS1 for vessel 81 and in key switch KS2 for vessel 82, and they are so arranged that the appropriate key cannot be removed to operate the stop valves without turning the key switch to "off." Referring to FIG. 5, when key switch KS1 is turned to "off" to release the key, the relay RLV1 is energised, operating V1 vessel fault alarm through its contacts V1b. A similar arrangement is provided for vessel 82.

With both vessels "on" the logic comparison circuit between vessels (as described in the aforementioned UK Pat. Specification No. 1,257,737) is in circuit: this has been modified to indicate, in the event of a vessel fault occurring, which of the two vessels is the faulty one. The faulty vessel will exhibit a higher level than the correct vessel, and this is determined as the drum water level falls towards the tripping point by the comparison of levels D and $c$, or $d$ and C. Thus if the level $c$ of vessel 82 shows "steam" while the higher level D of the vessel 81 still shows "water," then vessel 81 is faulty and the relay RLV1 is energised from the trip supply line through KS2, D4 at "water" and $c$4 at "steam." Similarly for C on vessel 81 at "steam" while $d$ on vessel 82 shows "water," RLV2 is energised.

Since a faulty vessel may subsequently be drained after the stop valves have been closed, assuming that the leak or blockage has been identified as being on vessel 81, extraction of the key to the valves involves switching KS1 to "off" which then keeps RLV1 operated. Draining of vessel 81, however, would cause C4 to go to "steam," giving a false operation of V2 fault alarm, and this is avoided by switching off the comparison circuit $d$4/C4 on KS1 when the stop valve key to vessel 81 is removed. When either vessel is shut off, therefore, both comparison circuits are out of service.

With both vessels operating correctly, the trip supply is connected through V1a and v2a in series to prime the A4 channel, so that when A4 and a4 both go to "steam" the main trip relay RLT is energised. If either A or a were to stick at "water" a trip connection would still be available, V1b being used to prime Y1: provided power unit Y is switched on and can supply channel B, Y1 is energised to prime B4, enabling a trip to be made via B4 and either A5 or a5, whichever is still available. In parallel with this path, V2b and X1 would prime b4, again using either A5 or a5 to complete the trip. One path is therefore also available if either vessel is shut down.

Again, if power unit Y has failed, both B4 and a5 will be inoperative: Y1 is therefore arranged to prime C5 in this case, completing the trip through A5, both of which are powered from X. In parallel with this path is V2b, X1, b4, and A5, allowing for a failure of either the C or the b channel as well as power unit Y. A similar arrangement is available to allow for the failure of power unit X instead of Y, through B4 and a5 or through c5 and a5.

If vessel 81 only is off, a trip may be made via either b4 and a5 or c5 and a5, depending on whether or not power unit X is on. Similarly, with vessel 82 only off, either B4 and A5 or C5 and A5 is available dependent on Y1.

In all the foregoing, the trip will be made when, and only when, either A or a changes from water to steam.

If required, the option may be included to allow operation of the trip at level b or B only if both vessel 81 and power unit Y are off together, or vessel 82 with power unit X. For the first of these dual faults, V1 off is identified by the connection of the trip supply through V1b to V1 fault alarm line. Provided vessel 82 is on, V2c connects Y2 to the V1 fault alarm line which, with power unit Y off, continues the sequence to X2, which in turn must be on to prime d5 in readiness for a trip to be completed through b5. For vessel 82 off together with power unit X, a similar trip may be made through V2b, V1c, X3, Y3, D5 and B5.

In only these two cases need the original specification be relaxed, and then only because, for these fault combinations, neither channel A nor a can be available.

The logic system described above provides a wanted low-level trip with absolute accuracy of level determination limited only by the accuracy of electrode placement and vessel density error, both of which should be constant. This accuracy is maintained in the presence of any one electronic fault and of some double electronic faults, offering an extremely high degree of security against measurement malfunction. The facility also exists for the installation, maintenance and repair, other than of the double isolation valves, of any part of the low level trip system, without interference to a wanted low-level trip and with the boiler kept on load.

Further embodiments of the invention now to be described with reference to FIGS. 6, 7, 8 and 9 are known as and are hereinafter referred to as "Hydratect" systems. These systems ae principally intended for providing a validated indication as to whether the water level at a particular point in a bled steam line, in a direct contact feed heater, a condenser, a boiler or any other item of steam plant is greater than a predetermined level, although it should be appreciated, as will be explained below, that the systems can readily be adapted to perform the converse function of indicating whether the water level is below a predetermined level.

Figure 6:
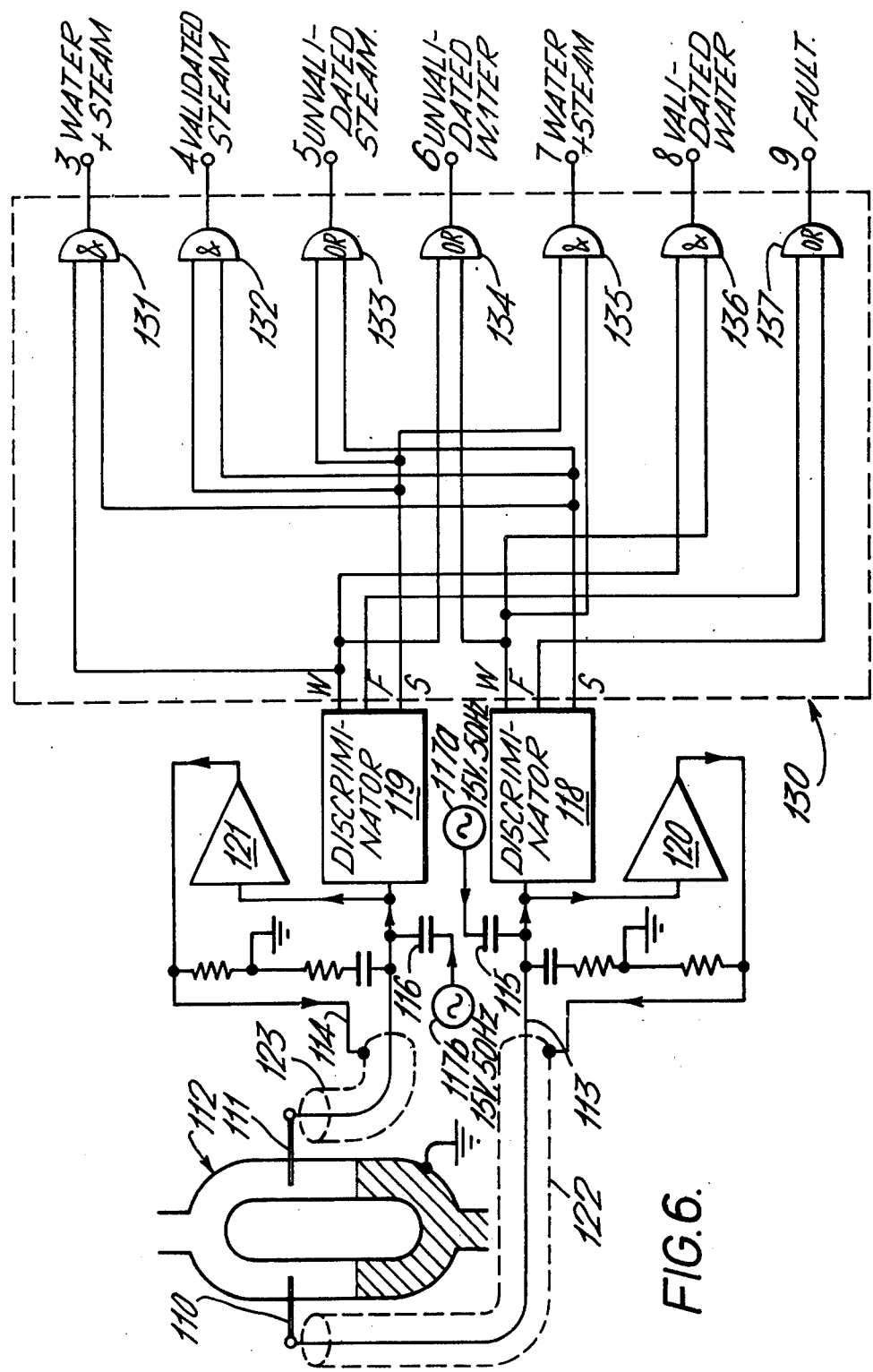
FIG. 6 is a diagram illustrating a twin electrode arrangement for detecting and validating a high water level in a variety of different types of plant, for example in a bled steam line, a direct contact feed heater or a condenser.

Systems having the electrode arrangements shown in FIGS. 6, 8(a) and 8(b) are designated, respectively, "Hydratect" I, II and III. Systems I, II and III use two, four and eight electrodes respectively. Each system employs simple validation at coincidental levels together with increasingly secure cross and sequential validation for systems II and III, respectively. The electronic circuits for each system are similar, each set of electrodes being provided with a standard basic module and appropriate group logic being provided to combine the outputs from the basic modules. It will be realised that, for any specific application on bled steam lines or feed heaters, the questions of whether or not automatic control of pumps or valves is required and whether an unwanted operation can cause a plant shutdown or not will govern both the choice of system and of the logic selected for the system. Clearly, the simpler the system chosen the less sophistocated can be the validation, giving to some degree a higher probability of an "unwanted action" occurring or of a failure to achieve a "wanted action." These two parameters are interchangeable to some extent, so that in general an improved reliability for a "wanted trip," for example, may be achieved at the expense of lower security against an "unwanted trip" or vice versa. The particular bias required in the Hydratect logic selected will usually be determined by the economic factors involved of plant outage versus plant damage, which in turn will depend upon the measurement point involved and the anticipated performance of other associated control apparatus. Each power station in conjunction with each measurement point chosen will therefore need to be considered individually in relation to the bias which must be applied to any control logic output. The higher the order of the "Hydratect" system chosen for a particular application, the less important does the logic bias become, simply because the greater number of alternative cross-validations provide higher security in both directions.

Referring now to FIG. 6, this shows in diagrammatic form a "Hydratect I" system. A pair of electrodes 110, 111 are disposed at the same level in an arbitrary vessel 112 which may be, for example, a boiler, a condenser, a direct contact feed heater or part of a bled steam line. Each electrode 110, 111 is connected by a lead 113, 114 to a separate high input impedance discriminator circuit 118, 119, each of which performs a substantially similar basic function for one electrode with its corresponding measuring channel as in Hydrastep but with the optional addition of a third (equipment fault) state. As with "Hydrastep," each electrode has applied to it through a high impedance capacitor 115, 116, a sensing supply of alternating voltage 117a, 117b, for example 15V at 50 Hz. For security reasons, as in previous examples, it is desirable that discriminator 118 together with its sensing supply 117a and its remaining associated circuitry should be fed from a different power source to discriminator 119 and sensing supply 117b. The high impedance of the capacitor 115 (116) in conjunction with the impedance presented by the electrode 110 (111) in parallel with the input impedance of the discriminator 118 (119) produces a potential at the discriminator which is high when the sensor is in steam, low when the sensor is in water, or zero under certain fault conditions (e.g. loss of power supply). Each discriminator applies an output signal to lead W, F or S, according to whether "water," "fault" or "steam" is detected. Some hysteresis is incorporated, as in "Hydrastep," in switching between water and steam. The vessel 112 is the common earth connection for both discriminators.

Because the leads 113, 114 between the electrodes and discriminators may be both long and of high impedance, their capacitance to earth and/or their susceptibility to pick-up may affect the signal appearing at the discriminators 118, 119. If necessary, therefore, they may be screened (122, 123) and the screens driven by unity-gain amplifiers 120, 121 of low output impedance to nullify these effects, as explained in U.K. Pat. Specification No. 771,674.

The circuits connected to the electrodes 110, 111 are arranged to provide no d.c. paths to the vessel 112 earth to prevent electrolytic corrosion problems.

The output signals on the W, F and S leads from the discriminators are connected to a basic logic module 130 comprising seven gates 131 to 137 each having its output connected to a respective one of seven output terminals 3 to 9.

The gates 131 and 135 are AND gates and are each connected to receive the "water" output signal from one discriminator and the "steam" output signal from the other and to indicate if these two signals are present together. The gates 132 and 136 are AND gates and are connected respectively, to the two discriminator "steam" output leads and the two discriminator "water" output leads to provide validated "steam" and "water" indications. The gates 133 and 134 are OR gates connected in the same manner as the AND gates 132 and 136, respectively, to provide unvalidated "steam" and "water" indications if either discriminator indicates "steam" or "water", respectively.

Under normal plant operating conditions, the water level in the vessel 112 will be below the level of the electrodes 110, 111 and the discriminators 118, 119 will thus both give separate "steam" outputs. Provided, therefore, that both discriminators give a "steam" output, the AND gate 132 will be actuated to give a "validated steam" output on terminal 4. If it is now assumed that the water level rises because of some malfunction in the main plant, it will at some stage reach the nominal electrode level. Because of the inevitable tolerance in the physical positioning of the electrodes, let it be further assumed that electrode 110 and its associated discriminator 118 will produce a "water" output marginally sooner than the electrode 111 and its associated discriminator 119. During this marginal period, therefore, discriminator 118 will give a "water" output while discriminator 119 indicates "steam," actuating the AND gate 135 to give a "water + steam" output on terminal 7. Conversely, for the tolerance in the opposite direction, discriminator 119 will indicate "water" while 118 indicates "steam," actuating the AND gate 131 to give a "water + steam" output on terminal 3. These last two conditions should be transitory, lasting not more than a few seconds, and are dealt with later in more detail. It is most unlikely that the plant malfunction postulated will cause the rise in water level to continue until both discriminators 118 and 119 show "water," actuating the AND gate 136 to give a "validated water" output on terminal 8. It is possible, however, that the plant malfunction could be rectified at the same instant that the transition stage is occurring, in which case the water level would fall and both discriminators would revert to "steam" and the AND gate 132 would again give a "validated steam" output on terminal 4.

Three categories of fault could exist on either electrode/discriminator assembly (110/118 or 111/119):- a. if an electrode lead (113 or 114 respectively) should become disconnected, it will appear to its associated discriminator that "steam" is present. When the water level rises, therefore, the remaining sound assembly will show "water" but the faulty one will continue to show "steam," and this condition will persist beyond the predetermined transitory period. Furthermore, the OR gate 133, normally giving an "unvalidated steam" output on terminal 5, will continue to do so and the OR gate 134 will also give an output of "unvalidated water" on terminal 6 when the sound electrode/discriminator assembly shows "water"; additionally, either the AND gate 131 or 135 will at that instant give an output on terminal 3 or 7 respectively, dependent on which electrode/discriminator assembly is at fault. Subsequent logic circuits are arranged to recognise that these conditions persist beyond the allowable transition period and that an equipment fault exists in addition to a plant malfunction: this logic is described later.

b. if an electrode (110 or 111) should become so contaminated by sludge or similar partially conductive material as to give a "water" output when steam was in fact present, the sound sensor would show "steam" and the effect would be the same as in (a) above, and would similarly be recognised.

c. if an electrode lead (113 or 114) were to become short-circuited to earth (e.g. as a result of mechanical damage), or if the separate sensing power supply associated with the relevant discriminator were lost, then the output of that discriminator would revert to a "fault" (F) condition, actuating the OR gate 137 to give an immediate "fault" output on terminal 9.

It is probable that any one bled steam line could be of sufficient length to require more than one drain point and perhaps a number of valves. From an operational viewpoint, particularly in relation to reloading of the set after a shut-down, it is necessary to know that the whole of any such line is adequately clear of water irrespective of which particular part was previously flooded. The individual separated "Hydratect I" outputs associated with, say, each drain and valve location on one such length of line may therefore be collected as a single indication, water-biased, for onward transmission.

Figure 7:
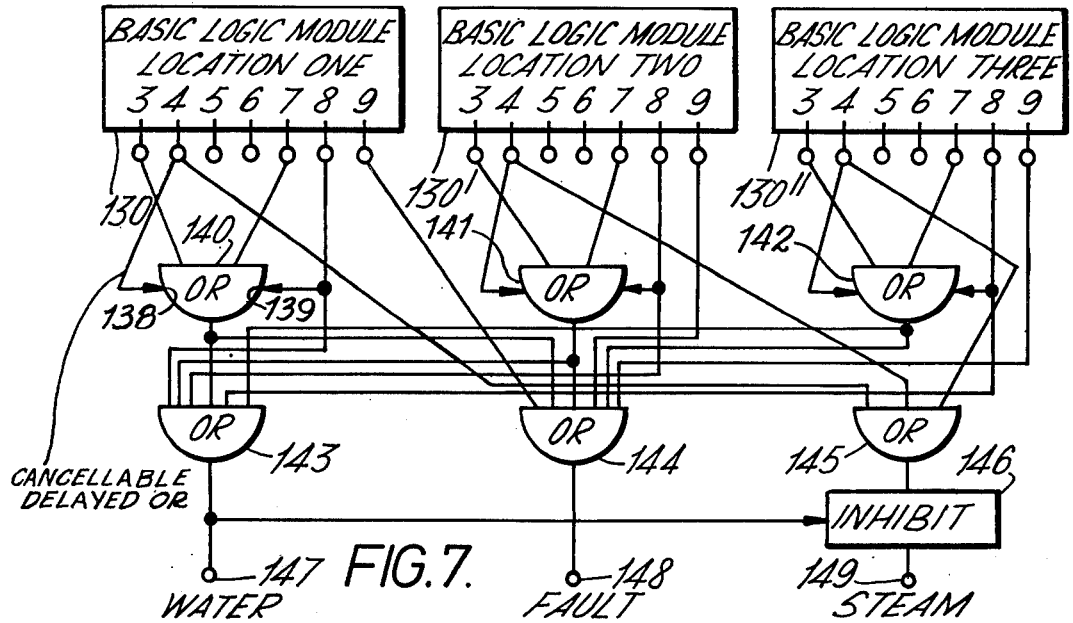
FIG. 7 is a diagram illustrating group logic circuitry for consolidating information provided by a plurality of, in this case three, arrangements as shown in FIG. 6, each pair of electrodes being disposed in a different location.

Group logic for grouping, for example, three separately located "Hydratect I" system outputs on this basis (each consisting of a single coincident pair of electrodes, the associated sensing circuitry and the basic logic module all as shown in FIG. 6) is shown in FIG. 7. The basic logic modules of the three systems are designated 130, 130' and 130''. The 3, 4 and 7-9 output terminals of each of these modules are connected to the group logic which comprises three cancellable DELAYED-OR gates 140, 141, 142, three conventional OR gates 143, 144 and 145 and an INHIBIT gate 146. The outputs of the OR gates 143 and 144 and the output of the INHIBIT gate 146 are connected to respective "water," "steam" and "fault" output terminals 147, 148 and 149.

As mentioned before, the indication of "water" by one electrode and "steam" by another prima facie means that there is an equipment failure. However, because of the engineering tolerances in the mounting of a pair of electrodes at nominally coincident levels, the expected turbulence of the water surface and the possibility of momentary splashing with minor pressure The "Hydratect III" system comprises a vessel 112" as shown in FIG. 8(b) which corresponds to the vessel 112 shown in FIG. 6 except that four pairs of electrodes A, B, C and D are provided, those forming each pair being at coincident levels. Each of the four pairs of electrodes is provided with a discriminator/sensing arrangement as shown in FIG. 6 for a single pair, and with a basic logic module as shown at 130 in FIG. 6.

The group logic circuitry for "Hydratect III," which is not illustrated, may comprise four cancellable DELAYED-OR gates and a plurality of conventional AND and OR gates. As will be readily appreciated by those skilled in the art, the group logic circuitry for "Hydratect III" is essentially an extension of the "Hydratect II" group logic circuitry shown in FIG. 9.

In all of the "Hydratect" systems, the power supply circuits, as in arrangements of FIGS. 1–5, will be so arranged that the sensing circuitry associated with each electrode of a coincident level pair, i.e. the discriminator circuits (and screen drive circuits, if used), are powered by separate supplies.

Figure 9:
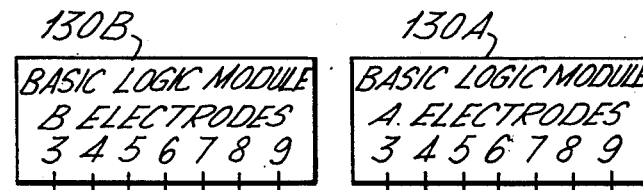
FIG. 9 is a diagram illustrating group logic circuitry for combining the indications provided by a twin electrode pair arrangement as shown in FIG. 8(a).
Figure 8:
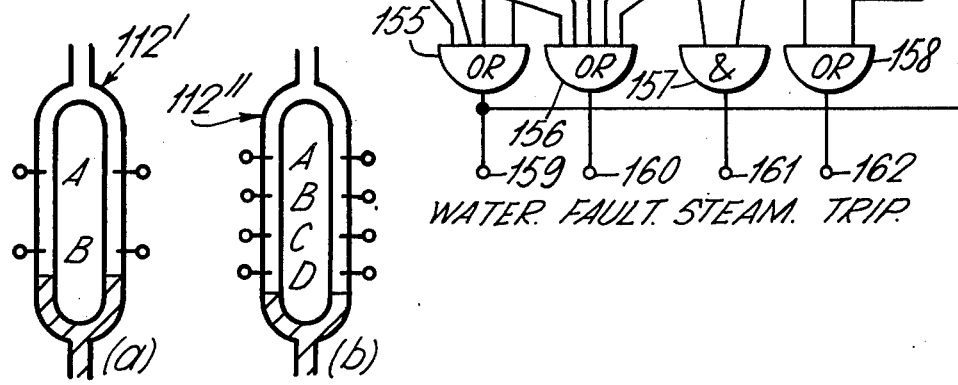
FIG. 8(a) and 8(b) are diagrams illustrating two modified versions of the arrangement of FIG. 6 in which two and four pairs, respectively, of electrodes are provided.

It will be realized, however that the logic circuits of FIG. 6, 7 and 9, insofar as being single entities they may require power supplies other than those provided to the discriminators, such supplies as are necessary for any logic circuit to function should be available from at least two sources. These sources may be the power supply units for the discriminators and/or additional supplies from the same units and/or separate power supply units. Whichever method is used, each power input feed to any logic circuit should be connected through an isolating diode or diodes to the appropriate common supply line or lines of that logic circuit, so that operation can continue unimpaired in the event of failure of any one power supply. Where the whole of the logic circuit requirements are taken from the same supply units which feed the relevant discriminators, indication of the failure of one of these supplies is already provided for, but where separate supplies are provided any failure of one such supply must be separately indicated to ensure prompt repair, since such failure will not otherwise be apparent in the operation of the equipment. A similar procedure is necessary in corresponding circumstances in relation to the supplies to the displays themselves.

In the case of all the "Hydratect" group logic circuits described above, means may be provided for displaying the signals provided at the group logic circuit output terminals. Also, if required, local displays may be provided for each basic logic module, i.e. for each pair of coincident level electrodes. Further the outputs from each of the group logic circuits in a section of a power station, assuming that more than one group is provided, may be gated together for transmission to the station control room for display.

As will be apparent from the description of the "Hydratect" systems, the logic is so arranged that any "water" indication, validated or not, is treated as of major importance and will override a "steam" indication and unless "water" is validated a "fault" indication will also be shown. This water-biassing is due to the systems being designed principally to detect a high water level. However, as mentioned before, the systems can readily be adapted for use in other applications in which the converse condition of the absence of water is the dangerous condition. In this case, identical logic can be used by simply reversing the "steam" and "water" outputs with a corresponding reversal of the connections, possibly including logic inverters, between all of the basic logic module output terminals and the group logic circuits. Identical logic circuit boards may therefore be used for either application. Many other combinations of discrete binary outputs for a variety of automatic alarm and/or control applications may be devised within the framework of the invention, nor need these applications be restricted to the level of a fluid. For instance, given that electrodes A to F inclusive of FIG. 1 were replaced by bimetal or Curie point switches each operating at substantially the same physical point in a furnace and each arranged to switch at one increment of temperature above the previous switch, a control system for the furnace temperature could be provided using the logic switching system explained for the first example, and controlling appropriate auxiliary plant (e.g. fuel pumps). A similar system could be used for, say, oil pressure in a pipe line. The invention may be applied to the detection of water or other fluids by thermal conductivity, thermal capacity or dissipation; of temperature by electrical, magnetic, Curie point, resistive, optical or hydraulic means; of flow rate by thermal dissipation, rotational methods or pressure differential; of pressure by electrical, hydraulic or mechano-optical sensors; and the like.

The use of a series of binary measurements of a parameter performed simultaneously and compared continuously to show that there is no apparent infringement of a natural law, for example, as in the arrangements described and claimed in U.K. Pat. Specification No. 1,056,032, such as with the "water cannot exist above steam" philosophy initiating a fault alarm if it appears to occur, ensures that the instrument can only "tell a lie" of insignificant proportions without calling attention to the error. The addition of the validation logic as described herein to an already reliable instrument results in a 'fail-operative' as well as 'fail-safe' control system eminently suitable for unattended service on major plant.

Because of these 'fail-safe' and 'fail-operative' characteristics, it will be observed that no provision has been made for any 'push-button type' testing procedures. Apart from the principle of continuous and often multiple validation already incorporated rendering such procedures superfluous, test systems of this nature have a considerably lower reliability than that of the multiple binary instruments themselves. Such test facilities, therefore, can be the direct cause of more undetected, and therefore dangerous, faults than occur on multiple binary instruments which do not include such testing systems.

We claim:

1. Apparatus for indicating a condition of and/or controlling a medium within a system by sensing a presence of a plurality of parameters of said medium and said system comprising:
   a. sensing means insulatively carried by said system in contact with said medium including a plurality of sensors having an output means to produce a first output upon sensing a first parameter, a second output upon sensing a second parameter, and a third output upon said sensor having a voltage potential proximating a voltage potential of said system,
   b. discriminating means having input means selectively connected to said sensing means to receive said output therefrom, and including a plurality of discriminators, said plurality having a value equal changes in the pipework, it is to be expected that a "water" indication from one electrode of the pair could occur either as a transient condition or a few seconds in advance of its validation as true "water" by the second electrode. Accordingly, the "water + steam" outputs on output terminals 3 and 7 of each basic logic module are connected to a respective one of the gates 140, 141, 142 which are arranged to give an output only after a predetermined period, say five seconds, has expired. The "validated steam" and "validated water" outputs on output terminals 4 and 8 of each basic logic module are each connected to a respective "cancel" input of the appropriate gate 140, 141, 142, the inputs being designated 138 and 139 for gate 140, so that the gate is cancelled and reset and no output is produced if both electrodes indicate either "steam" or "water" before the period has expired. If no "cancel" is applied the output of the appropriate gate produces a "fault" signal on output terminal 148 via OR gate 144. Also, as detection of water is all important in this system, the output is also passed via OR gate 143 to produce a "water" signal on output terminals 147.

The "water" OR gate 143, as well as receiving inputs from each of the DELAYED-OR gates 140, 141, 142, also receives the "validated water" signals from each of the output terminals 8 of the basic logic modules 130, 130' and 130''. The "fault" OR gate 144, as well as receiving inputs from each of the DELAYED-OR gates 140, 141, 142, also receives the "fault" signals from each of the output terminals 9 of the basic logic modules 130, 130' and 130''. The "steam" OR gate 145 receives the "validated steam" signals from each of the output terminals 4 of the basic logic modules 130, 130' and 130''.

Since in this application the presence of water at any point in the group concerned is regarded as the dangerous condition, the output of the "water" OR gate 143 is arranged to inhibit any output from the "steam" OR gate 145 by means of the INHIBIT gate 146, irrespective of whether "water" appears as the result of a validated condition or from the expiry of the delay period from a DELAYED-OR gate. In the latter case, however, a "fault" indication will appear with "water": if validation occurs after this time, the "fault" indication will simply be removed.

It will be apparent to those skilled in the art that the arrangement of FIG. 7 can readily be adapted to deal with two "Hydratect I" systems or any practical number greater than three by providing the appropriate number of DELAYED-OR gates and by providing the appropriate number of inputs to the OR gates 143, 144, 145.

It will also be apparent to those skilled in the art that the arrangement of FIG. 7 can readily be adapted to deal with a single "Hydratect I" system.

In the case of the arrangement of FIG. 7, the only interdependence between the coincident pairs of electrodes at different locations in the group lays in the requirement for "water" at any location to override "steam" at any or all of the remaining locations. For Hydratect II, however, with two coincident pairs of electrodes at any one location, there is a higher order of interdependence between pairs: each location is therefore treated as a separate group, the logic for which is shown in FIG. 9.

FIG. 9 shows diagramatically the group logic circuitry for combining the outputs from the two basic logic modules 130A and 130B in a "Hydratect II" system. The "Hydratect II" system comprises a vessel 112' as shown in FIG. 8(a) which corresponds to the vessel 112 shown in FIG. 6 except that two pairs of electrodes A and B are provided, these forming each pair being at coincident levels. Each pair of electrodes is provided with a discriminator/sensing arrangement as shown in FIG. 6 for a single pair, each such arrangement being connected to the appropriate one of the basic logic modules 130A and 130B, each as shown at 130 in FIG. 6.

Turning now to FIG. 9, the group logic circuitry there shown includes a pair of cancellable DELAYED-OR gates 150, 151, one for each basic logic module 130A, 130B. The gates 150, 151 are identical in function and are connected to their respective basic logic modules in the same manner as the gates 140, 141 and 142 of FIG. 7, and will not therefore be described further. The group logic circuitry also includes further gates 152 to 158, the functions of which will be explained below. The outputs of gates 155, 156, 157 and 158 are connected to "water," "fault," "steam" and "trip" output terminals 159, 160, 161, 162, respectively.

If the water level in vessel 112' is rising and one of the B electrodes is stuck at steam, when the water level reaches electrodes B no "validated water" signal will be provided at output terminal 8 of basic logic module 130B. Although the switching of the non-faulty electrode of pair B will result in the eventual indication of a fault by DELAYED-OR gate 150, if the level is rising rapidly the water level may reach the level of electrodes A before the delay period of gate 150 has expired. Accordingly, the AND gate 152 is connected to the "unvalidated water" output terminals 6 of both modules to provide a validated "water" signal via the "water" OR gate 155 as soon as any one or both of the electrodes in each set indicates "water."

The "water" OR gate 155, as well as receiving an input from the AND gate 152, receives inputs from the "validated water" output terminals 8 of both modules 130A and 130B and from the output of the DELAYED-OR gate 150, any one of which will activate the "water" output terminal 159 and will also enable the AND gate 154, so that if the DELAYED-OR gate 151 also applies a time-expired "fault" signal to the other input of gate 154 the "trip" output terminal 162 will be activated via OR gate 158. If output terminal 8 of module 130A indicates "validated water" at the upper A electrodes, the "trip" output terminal will be activated immediately via the OR gate 158.

The "fault" OR gate 156 is connected to receive a "fault" signal from the "fault" output terminal 9 of each of the modules 130A and 130B. It is also connected to respond to a fault signalled by either of the DELAYED-OR gates 150 and 151. Finally, the gate 156 is also connected to signal a fault in response to an input from the AND gate 153. The gate 153 will only produce an output if the lower B electrodes indicate "unvalidated steam" via output terminal 5 of module 130B at the same time as the upper A electrodes indicate "unvalidated water" via output terminal 6 of module 130A, which clearly indicates a fault as water cannot lie above steam.

In accordance with the water-biassing of the "Hydratect" system, the safe "steam" condition will only be signalled at "steam" output terminal 161 if AND gate 157 simultaneously receives "validated steam" signals from output terminal 4 of both modules 130A and 130B.

to said plurality of said sensors, said discriminators having a first, second, and third output means, said respective output means producing an output upon said sensor producing said first output, said second output or said third output, and c. basic logic module means to respond to an output from said discriminator means comprising a plurality of sets of AND and OR gates, said plurality having a value less than said plurality of discriminators, said gates having input means selectively connected to said first, second and third output means of said discriminators and having output means producing an output upon receiving a selected input, wherein said system can be controlled as a function of said control outputs of said gates.

2. Apparatus as described in claim 1 and further characterized by said apparatus further comprising, a vertically mounted vessel having two parallel passages positioned between a common top and bottom inlet, said vessel having a voltage potential proximately zero, said medium comprising a fluid and said parameters of said medium including said fluid in a liquid state and in a gaseous state, a power source comprising a plurality of power supplies, one each of said supplies connected to one each of said sensors, said plurality of sensors comprising a first and second electrode horizontally aligned and carried one each by said passage of said vessel, and said output of said electrodes being a high voltage potential in the presence of said fluid in the liquid state, a low voltage potential in the presence of said fluid in the gaseous state, and a zero voltage potential upon a fault condition, said plurality of discriminators including a first and second high impedance discriminator having a respective input means connected to said respective first and second electrode, and first, second and third output means of said discriminator producing a respective output upon said discriminator receiving a high, low or zero voltage input upon said electrode sensing said fluid in the liquid or gaseous state or said fault condition, basic logic module means including a first set of eight gates and including, a first and second liquid/gas AND gate (3,7) having said respective input means connected alternatively to said first and second output means of said first and second discriminators, a validated gaseous AND gate (4) having said input means connected to said second output means of said first and second discriminators, an unvalidated gaseous OR gate (5) having said input means connected to said second output means of said first and second discriminators, an unvalidated liquid OR gate (6) having said input means connected to said first output means of said first and second discriminators, a validated liquid AND gate (8) having said input means connected to said first output means of said first and second discriminators, and a fault OR gate (9) having said input means connected to said third output means of said first and second discriminators.

3. Apparatus as defined by claim 1 and further characterized as comprising:

said plurality of said sets of basic logic gates being at least 3.

a like plurality of cancellable OR gates having input means selectively connected to said basic logic gates and output means to produce an output upon receiving a selective input, a like plurality of conventional OR gates having input means selectively connected to said basic logic gates and to said output means of said cancellable OR gates, and output means to produce an output upon receiving a selected input, output terminal means comprising a plurality of terminals, said plurality having a value equal to said plurality of said medium parameters and a fault terminal, said terminals having input means selectively connected to said output means of said conventional OR gates and output means to produce a control output upon receiving a selective input, wherein said system can be further controlled as a function of said control outputs of said terminal means.

4. Apparatus as defined by claim 3 and further comprising, an inhibit means selectively connected between said output means of said conventional OR gates and said input means of one of said output terminals to selectively block inputs into said terminal.

5. Apparatus as defined by claim 4 and further characterized by, said plurality of sets of gates of said basic logic module means comprising a first, second and third set, said plurality of cancellable OR gates including a first, second and third cancellable OR gate each having said respective input means connected respectively to an output means of a respective liquid/gas AND gate (3,7) of said first, second and third set of basic module gates respectively, and each having a cancellable input means connected respectively to an output means of a validated gaseous AND gate (4) and a validated liquid AND gate (8) of said first, second and third sets of basic module gates, said plurality of said conventional OR gates comprising a first, second and third OR gate, said first conventional OR gate having said input means connected to said output means of said validated gaseous AND gates (4) and to said validated liquid AND gates (8) of said first, second and third sets of basic module gates and to said output means of first, second and third cancellable OR gates, said second conventional OR gate having said input means connected to an output means of a fault OR gate (9) of said first, second and third set of basic module gates, and to said output means of said first, second and third cancellable OR gates, said third conventional OR gate having said input means connected to said output means of said validated gaseous AND gate (4) of said first, second and third set of basic module gates, said inhibitor means comprising an inhibit gate having said input means connected to said output means of said third conventional OR gate and an inhibit input means connected to said output means of said first conventional OR gate, said output terminal means comprising a liquid, fault and gaseous terminal, said liquid terminal having said input means connected to said output means of said first conventional OR gate, said fault terminal having said input means connected to said output means of said second conventional OR gate, and said gaseous terminal having said input means connected to said output means of said inhibit gate.

6. Apparatus as defined by claim 1 and further comprising,
   said plurality of said sets of said basic logic gates being at least 2,
   a like plurality of cancellable OR gates, said gates having input means selectively connected to said output means of said basic logic gates, and output means to produce an output upon receiving a selective input,
   group logic circuitry means comprising a plurality of AND and OR gates, said gates having input means selectively connected to said output means of said basic logic gates and said output means of said cancellable OR gates, and output means to produce an output upon receiving a selected input,
   output terminal means comprising a plurality of output terminals, said plurality having a value equal to said plurality of medium parameters, a grounding terminal and a trip terminal, said terminals having input means selectively connected to said output means of said basic logic gates, of said cancellable OR gates and of said group logic circuitry gates, and output means to produce an indication output upon receiving a selected input,
   wherein said system can be further controlled as a function of said indication outputs of said terminal means.

7. Apparatus as defined by claim 6 and further characterized by,
   said plurality of sets of basic logic gates comprising a first and second set,
   said plurality of cancellable OR gates comprising a first and second cancellable OR gate each having said input means connected to an output means of a respective liquid/gas AND gate (3,7) of said first and second set of basic module gates respectively, and each having a cancellable input means connected to an output means of a validated gaseous AND gate (4) and a validated liquid AND gate (8) of said respective first and second set of basic module gates,
   said plurality of AND gates of said group logic circuitry means comprising first, second, third and fourth AND gates,
   said input means of said first AND gate connected to an output means of an unvalidated liquid OR gate (6) of said first and second set of basic logic gates,
   said input means of said second AND gate connected to an output means of an unvalidated gaseous OR gate (5) of said first set and to said output means of said unvalidated liquid OR gate (6) of said second set of basic logic gates,
   said input means of said third AND gate connected to said output means of said validated gaseous AND gate (4) of said first and second sets of basic module gates, and
   said input means of said fourth AND gate connected to said output means of said second cancellable OR gate,
   said plurality of OR gates of said group of logic circuitry means comprising a first, second and third OR gate,
   said input means of said first OR gate connected to said output means of said first cancellable OR gate, to said validated gaseous AND gates (4) and said validated liquid AND gates (8) of said first and second set of basic logic gates, and to said output means of said first AND gate, said first OR gate having said output means connected to said input of said fourth AND gate,
   said input means of said second OR gate connected to said output means of said first cancellable OR gates, to an output means of a fault OR gate (9) of said first and second set of basic logic gates, and to said output of said second AND gate,
   said input means of said third OR gate connected to said output means of said validated gaseous AND gate (4) and to said validated liquid AND gate (8) of said second set of basic logic gates and to said output means of said fourth AND gate, and
   said plurality of output terminal means further comprising a liquid terminal and a gaseous terminal,
   said input means of said liquid terminal connected to said output means of said first OR gate,
   said input means of said fault terminal connected to said output means of said second OR gate,
   said input means of said gaseous terminal connected to said output means of said third AND gate, and
   said input means of said trip terminal connected to output means of said third OR gate.

* * * * *